United States Patent
Taylor et al.

[11] 3,901,008
[45] Aug. 26, 1975

[54] CROP GATHERING APPARATUS

[76] Inventors: Howard W. Taylor, 1108 Summer St.; Richard C. Pedersen, 1503 Broad St., both of Grinnell, Iowa 50112

[22] Filed: Nov. 5, 1973

[21] Appl. No.: 412,735

[52] U.S. Cl. .................. 56/344; 56/13.3; 56/351
[51] Int. Cl.² ........................................ A01D 87/10
[58] Field of Search .................. 56/341, 344–361, 56/364, 328 R, DIG. 1, 13.3

[56] References Cited
UNITED STATES PATENTS

| | | | |
|---|---|---|---|
| 1,346,433 | 7/1920 | Varland | 56/345 X |
| 2,955,403 | 10/1960 | McKee | 56/13.3 |
| 3,664,099 | 5/1972 | Chovinard | 56/13.3 |
| 3,732,672 | 5/1973 | Adee et al. | 56/344 |
| 3,748,840 | 7/1973 | Kanengieter et al. | 56/341 |
| 3,782,086 | 1/1974 | Anderson | 56/344 |

FOREIGN PATENTS OR APPLICATIONS
267,946   1/1969   Austria .................. 56/345

*Primary Examiner*—Louis G. Mancene
*Assistant Examiner*—J. N. Eskovitz
*Attorney, Agent, or Firm*—Henderson & Strom

[57] ABSTRACT

A crop gathering apparatus comprising a crop pickup unit having flails rotated about an axis transverse to the direction of movement of the apparatus and operable to pick up the crop either from a windrow or crop refuse and throw it rearwardly through a crop receiving chamber axially of the said direction, and with the chamber passing the crop into the center of a crop blowing unit which includes a blower rotating in a vertical plane about an axis co-axial with said direction, the blower operable to throw the crop upwardly and rearwardly.

14 Claims, 12 Drawing Figures

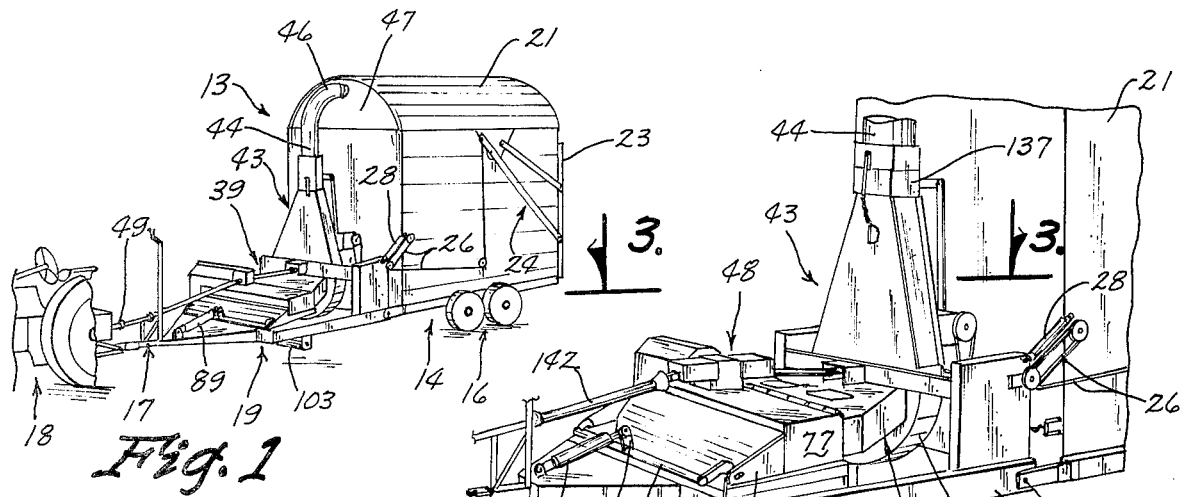
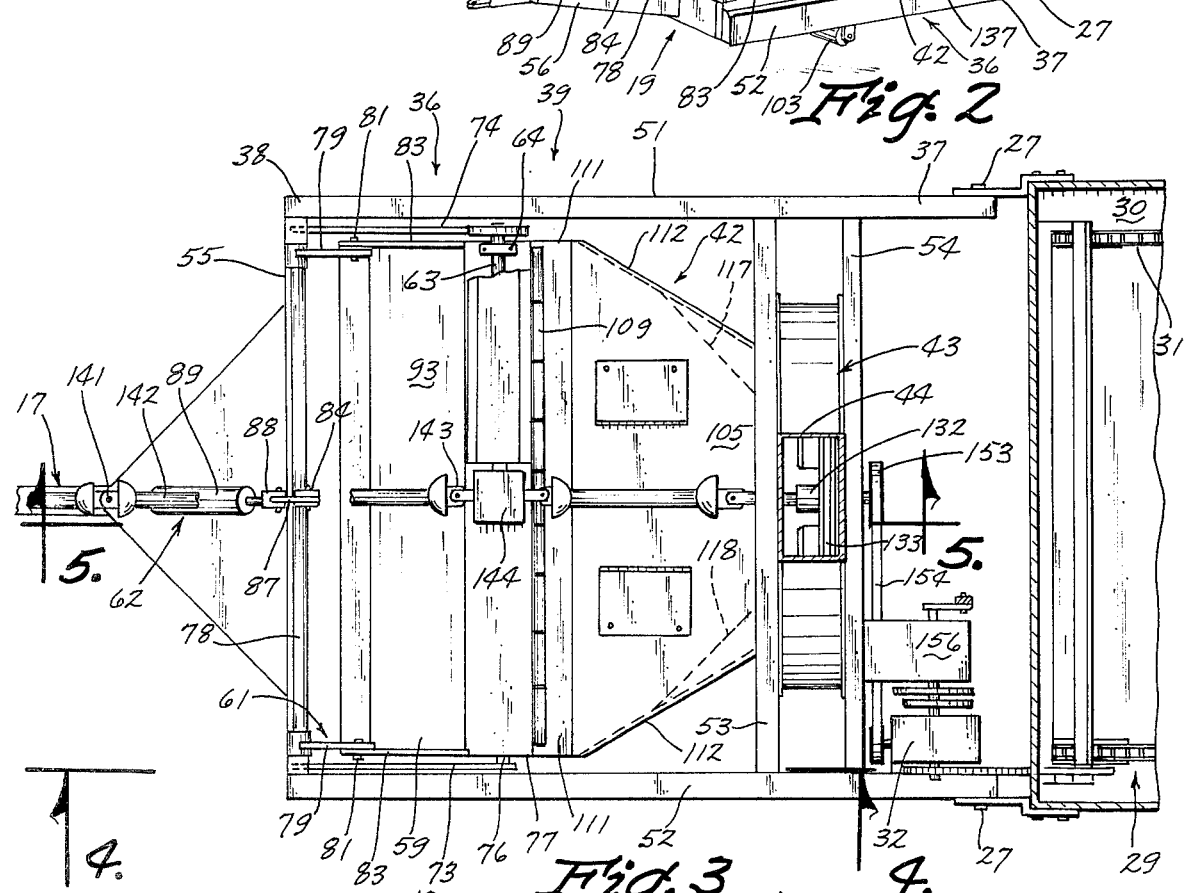
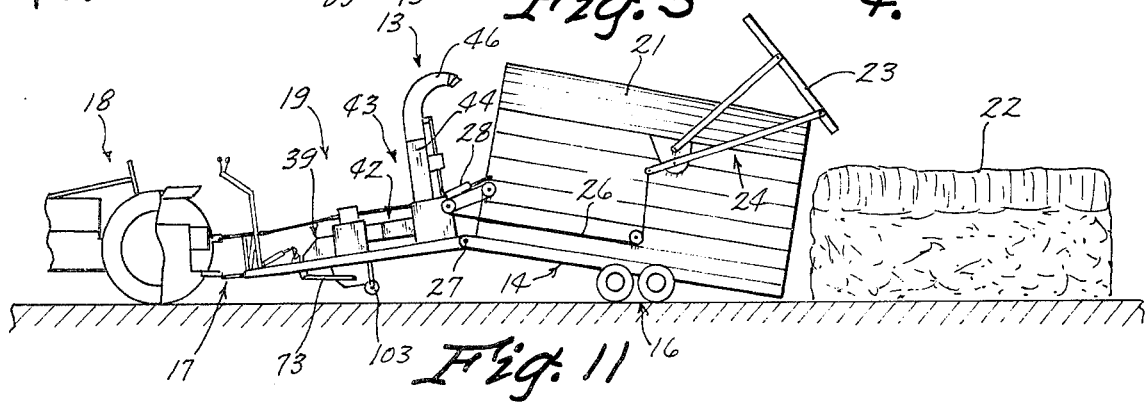

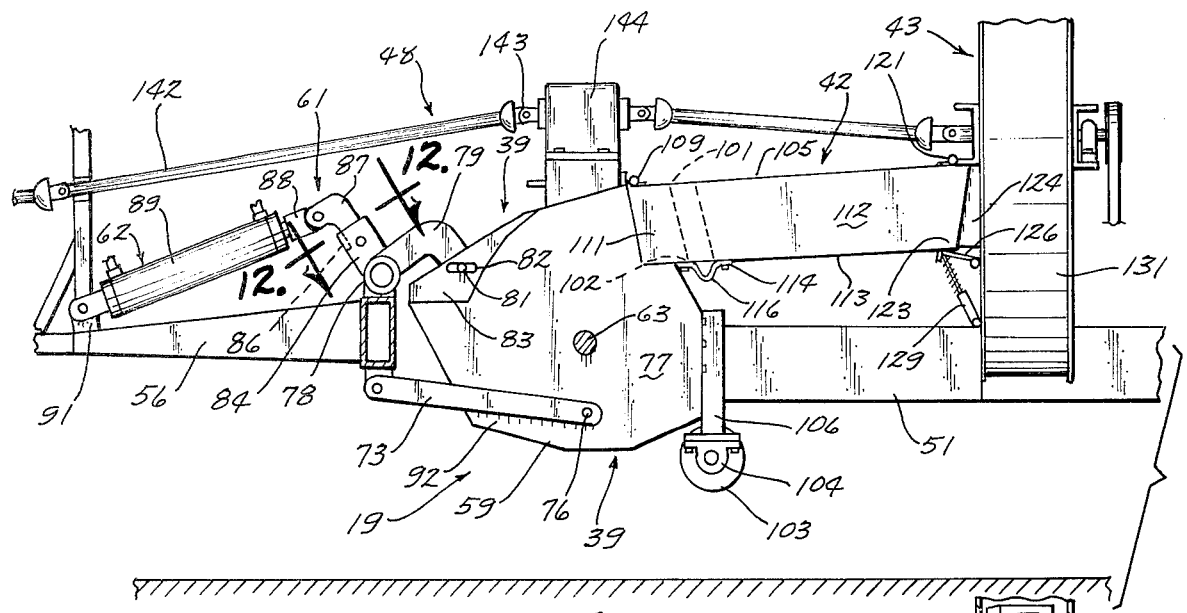
Fig. 4
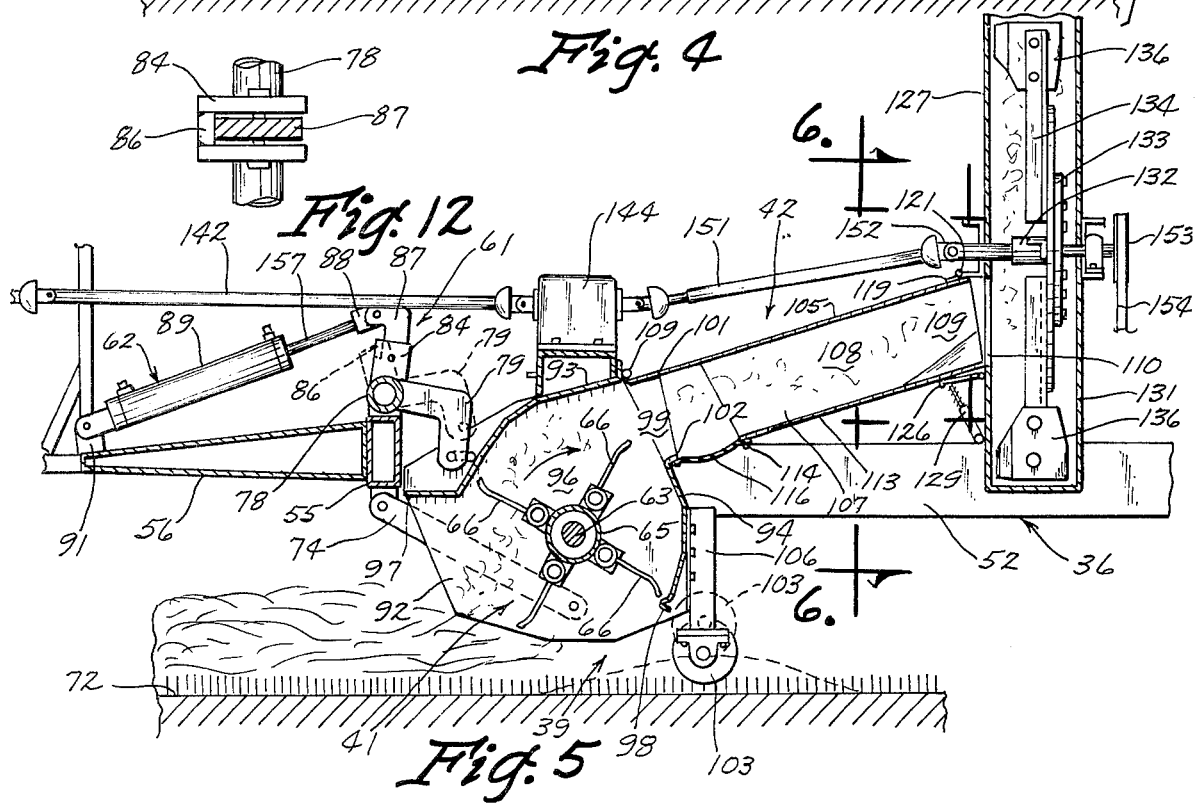
Fig. 12
Fig. 5

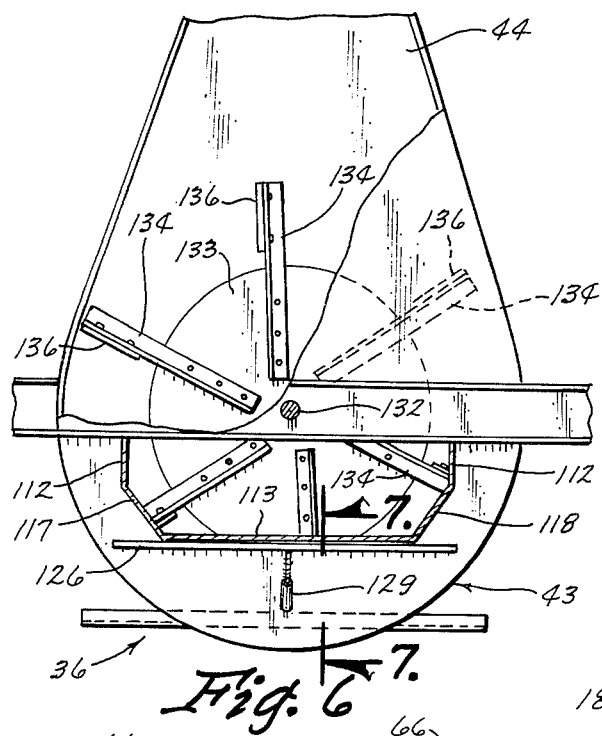
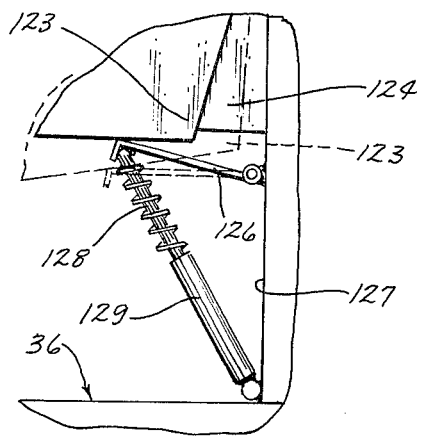
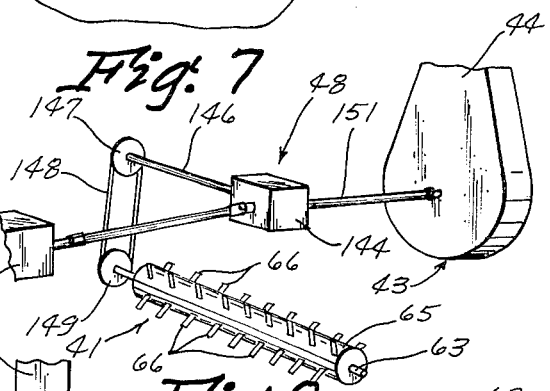
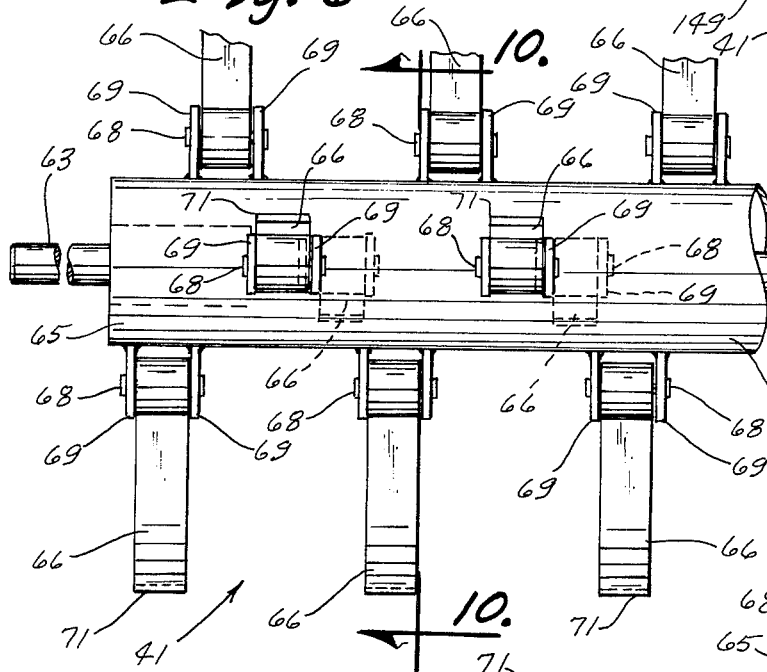
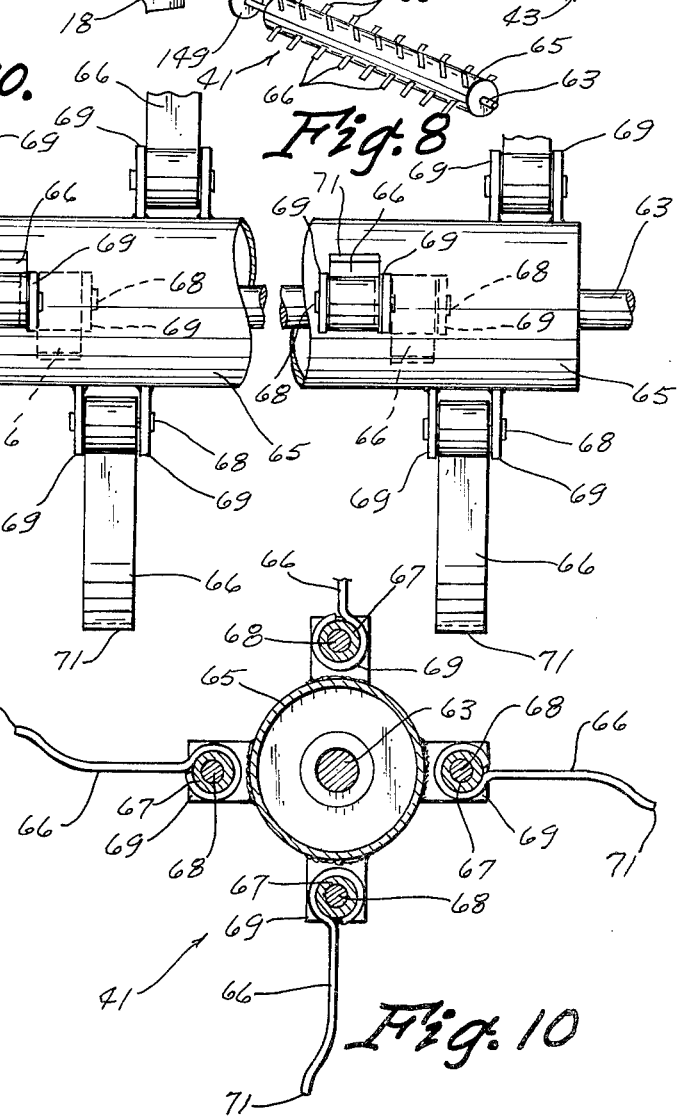

CROP GATHERING APPARATUS

BACKGROUND OF THE INVENTION

The gathering of crops by flails or the like is taught by U.S. Pat. Nos. 2,786,317 to Lundell, and 3,732,672 to Adee et al. wherein a flail picks up the precut crop and throws it rearwardly and upwardly through a delivery tube to a wagon. Another type of arrangement is shown in U.S. Pat. Nos. 2,888,795 to Lundell and 3,556,327 to Garrison. These structures teach a flail chopper or crop pickup unit which throws the crop rearwardly into a lateral auger from which the crop is then thrown upwardly and rearwardly by a vertically disposed auger.

Applicant was using a finger pickup for transferring hay into an auger and thence to a blower, but upon attempting to make the unit more universal for gathering corn stover found that this arrangement was unsatisfactory. To the solution of this problem this invention was directed, resulting in the satisfactory gathering by a single machine of hay and stover and including the use of a blower for raising and discharging the crop, but eliminating the auger by substituting an axial transition chamber.

SUMMARY OF THE INVENTION

This invention comprises a crop gathering machine comprising frame means; crop gathering means pivotally mounted on the frame means and adjustable between vertically spaced positions, said gathering means having a rotatable unit extended transversely to the normal direction of travel of the machine and operable to pick up and throw the crop rearwardly thereof relative to the normal direction; crop receiving means connected in direct communication to the rear of the gathering means for transferring the gathered crop rearwardly and co-axially of the said normal direction of travel; and crop blowing means connected in direct communication with the receiving means to the rear thereof, the blowing means including a vertically disposed chamber having a fan rotatably mounted therein for rotation about a horizontal axis co-axial with the said normal direction of travel.

An ancillary result of the aforementioned arrangement is the provision of a drive for the crop gathering machine off the power take-off of the tractor directly, extended rearwardly axially of the entire equipment, and substantially horizontally from the power take-off to the axis of the blower, thereby providing a drive train of the most effective and efficient construction.

It is an object of this invention to provide a new and novel crop gathering apparatus.

It is another object of this invention to provide a crop gathering apparatus for picking up either hay or stover and readily and efficiently discharging the crop through a higher spout for discharge into a wagon, for example.

Another object of this invention is the provision of a crop gathering apparatus utilizing a transverse flail pickup in combination with a vertically disposed fan or blower, and wherein a conventional auger is eliminated and replaced by a much less expensive and more practical transition or transfer chamber disposed between the crop gathering apparatus and the blower.

Still another object of this invention is the provision of a crop flail-type pickup chamber, a transition or transfer chamber, and a blower chamber, all in-line or co-axial with the longitudinal axis of the equipment and the direction of movement therewith, and further all of these units adapted to be in substantially horizontal alignment.

Another object of this invention is the provision of enabling both the pickup chamber and the transfer chamber to float relative to each other as the machine moves across the field, and with particularly the pickup chamber being substantially maintained in a horizontal disposition.

Yet another object of this invention is the provision of a crop gathering apparatus having a plurality of flails for crop pickup purposes, which flails are mounted in an arcuately staggered arrangement about a shaft whereby they rotate through, in elevation, a complete swath.

It is another object of the invention to provide a crop gathering machine capable of fulfilling the above designated objectives which is economical, effective, and readily serviceable.

BRIEF DESCRIPTION OF THE DRAWINGS

FIG. 1 is a perspective view of the crop gathering apparatus of this invention shown in assembled relation with a covered wagon;

FIG. 2 is an enlarged perspective view of the crop gathering apparatus of FIG. 1;

FIG. 3 is a further enlarged plan view of the apparatus of FIG. 2, taken partly in section along the lines 3—3 of FIG. 2;

FIG. 4 is a side elevational view of the crop gathering apparatus of this invention as seen along the line 4—4 in FIG. 3;

FIG. 5 is a cross-sectional view as taken along the line 5—5, and showing the apparatus in use;

FIG. 6 is an elevational view as taken along the line 6—6 in FIG. 5, certain parts in section and others broken away for purposes of illustration;

FIG. 7 is an enlarged detailed view as taken along the line 7—7 in FIG. 6;

FIG. 8 is a schematic view of the drive train of the apparatus;

FIG. 9 is a greatly enlarged, fragmentary view of a portion of the flail assembly of the apparatus;

FIG. 10 is a sectional view taken along the lines 10—10 in FIG. 9;

FIG. 11 is a reduced view of the crop gathering apparatus and the covered wagon, and wherein a stack of hay has been discharged from the wagon; and FIG. 12 is an enlarged view as taken along the lines 12—12 in FIG. 4.

DESCRIPTION OF THE PREFERRED EMBODIMENT

Referring now to the drawings, a preferred embodiment of this invention is illustrated as part of a vehicle indicated generally at 13 (FIG. 1) and which includes a frame assembly 14 mounted on a wheel and axle unit 16 for movement across a field by connection of a towing hitch 17 to a tractor 18 or other prime mover.

The vehicle 13 includes a crop gathering apparatus 19 (FIG. 1), to which this invention is particularly directed, and a crop receiving wagon 21 within which a stack 22 is formed and then discharged therefrom (FIG. 11). The wagon 21 includes further a rear gate 23 covering over the rear of the wagon body and which is operated between a closed position (FIG. 1) and an open position (FIG. 11) by a parallel linkage arrangement 24 and a pulley and cable assembly 26 affixed to each side of the wagon 21.

The wagon frame 27 (FIG. 3) has a pivotal connection at 27 with the crop gathering apparatus 19, and in response to actuation of a pair of cylinder assemblies 28 (FIG. 2, only one showing), the wagon 21 and apparatus 19 are tilted as best illustrated in FIG. 11, at which time the rear gate 23 is also raised and a conveyor slat unit 29 (FIG. 3) mounted on the floor 30 of wagon 21 is simultaneously engaged and moved rearwardly across the floor 30 due to rotation of a chain 31 from a gear reduction unit 32. Assuming the wagon 21 had been previously filled with hay, stover and/or other crop refuse which was formed therein into a stack of the bread-loaf type, the tilting and conveying action would thereby discharge the stack 22 from the wagon (See FIG. 11).

The crop gathering apparatus 19 of this invention comprises generally a frame unit 36 (FIG. 3) connected at its rear 37 to the pivot 27 and at the front 38 to the hitch 17; a crop gathering assembly 39 having a rotatable flail unit 41 extended transversely to the normal direction of travel of the vehicle 13 and operable to pick up a windrow of hay, or the crop refuse and to throw the material rearwardly into a crop receiving unit 42 (FIG. 4) which is connected in direct communication to the rear of the gatherer 39 for transferring the gathered crop again rearwardly; and a crop blowing unit 43 (FIGS. 2 and 4) which receives the crop from the receiving unit 42 and which blows it upwardly through an oscillating tube 44 and its upper curved end 46 into the open front end 47 of the wagon 21. A drive train indicated generally at 48 in FIGS. 2 and 8 for operating the gatherer 39, the receiver unit 42, and the blower unit 43 is provided, being driven off the tractor p.t.o. 49 (FIG. 3).

The frame unit 36 comprises a pair of laterally spaced, parallel side members 51 and 52 (FIG. 3) interconnected near their rear ends by a pair of transverse members 53 and 54 spaced longitudinally apart to support the blowing unit 43. At the front of the side members 51, 52 is a front member 55 (FIG. 4) to which is secured a V-shaped unit 56 (FIG. 5) leading to the towing hitch 17.

As best shown in FIGS. 3, 4, and 5, the crop gathering unit 39 includes generally the flail unit 41 for picking up the material, a housing unit 59 for supporting the flail unit 58 and for controlling the crop, a linkage unit 61 for positioning the housing unit 59, and a hydraulic lift unit 62 for operating the linkage unit 61.

More specifically, the flail unit 58 includes an elongated driven shaft 63 (FIGS. 3, 8 and 9) supported in bearing blocks 64 (only one showing) lengthwise of the housing unit 59 and transversely of the vehicle 13, with a tubular element 65 (FIGS. 9 and 10) mounted about and rotated by the shaft 63. A plurality of flails 66 are each pivotally mounted on the tube 65 by bushings 67, pins 68 and parallel projections 69 of conventional structure. It will be noted that within each set of four adjacent flails, each flail is mounted 90° arcuately of the next adjacent flail, and with all four flails 66 being placed next to each other longitudinally of the tube 65. This equidistant spacing provides for each set of flails to move through a complete swath laterally of the vehicle 13 (FIG. 9).

By this arrangement, and in conjunction with the tip ends 71 of the flails being slightly curved as illustrated in FIG. 10, clockwise rotation of the flail unit 68 (FIG. 5) causes the material (see FIG. 5) to be lifted from the ground 72 and thrown upwardly and rearwardly within the housing unit 59, also in a clockwise direction. It may be noted that straight flails may be used under certain conditions.

The linkage unit 61 includes a pair of elongated parallel arms 73 and 74 (FIGS. 3 and 4) each pivoted at one end to the underside of an outer end of the front frame member 55 and each pivoted at the other end 76 to the side 77 of the flail housing unit 59. It includes further an elongated rock shaft 78 (FIGS. 3 and 5) rotatably mounted across the length of the front frame member 55 and having an L-shaped rock arm 79 at each end thereof. A lateral projection 81 is formed on the free end of each rock arm 79 and is inserted through a slot 82 (FIG. 4) formed horizontally and longitudinally of the vehicle 13 in an upstanding end plate 83 (FIG. 3) secured at each front end of the housing unit 59.

At the center of the rock shaft 78 is mounted a U-shaped member 84 closed at the front 86 and open at the rear as best shown in FIG. 12 and within which is pivotally connected an L-shaped link 87 (FIG. 4). To the front of the link 87 is pivotally connected the yoke 88 of the hydraulic lift unit 62; this unit 62 comprising a hydraulic piston and cylinder 89, double acting or single acting as the case may be, and mounted at its forward end on a projection 91 secured to the front of the front unit 56. Operation of these elements will be described hereinafter.

The housing unit 59 for the flail unit 41 includes a generally circular housing 92 (FIG. 5) in cross section extended the entire width of the vehicle 13 (FIG. 3), having a top 93, rear 94 and sides 77 which combine to form a chamber 96 (FIG. 5) for the flails 66. A mouth or inlet between the sides 77 is formed between the front edge 97 of the top 93 and the bottom edge 98 of the rear 94, it being noted the inlet faces forwardly and downwardly; and an outlet is formed at 99 between the rear edge 101 of the top 93 and the upper edge 102 of the housing rear 94.

In one embodiment of the housing 92, the chamber 96 has an approximate length of 69 inches, with the diameter of the flail unit 41 being approximately 22 inches, and the outlet 99 approximately 10 inches high and 69 inches wide. At the rear of the housing 92, an elongated ground engageable roller 103 (FIG. 4) is rotatably mounted in bearing blocks 104 secured to the bottoms of leg members 106 secured to the lateral ends of the rear 94 of the housing 92. When in use, the roller 103 spaces the housing inlet and the flail unit 41 a proper distance off the ground 72, and also provides for the crop gathering assembly 39 following the contour of the ground as explained in detail hereinafter.

Crop material thrown through the outlet 99 (FIG. 5) of the crop gathering housing 92 is received within the receiving unit indicated generally at 42 in FIGS. 3, 4 and 5. This unit 42 comprises a transition housing 107 which forms a chamber 108 recedes from an opening overlapping the outlet 99 to a rear outlet 109 (FIG. 5) communicating with the inlet 110 to the crop blowing unit 43. The housing 107 has a top 105 (FIG. 3) hinged at 109 to the top 93 of the gathering housing 92, front side panels 111 which overlap the upper rear portions of the sides 77 to provide for relative movement between the housing 92 and 107 not exposing the chamber 108, rear converging side panels 112 and a bottom 113 (FIG. 5). The leading edge 114 of the bottom 113 is connected by a flexible member 116 to the upper edge 102 of the rear 94 of the gathering housing 92 to maintain closed any gap therebetween during use and relative movement of the crop gathering apparatus 19.

Referring to FIG. 6, the rear portion of the crop receiving housing 107 is shown in cross section. It is readily seen that the chamber 108 not only converges rearwardly as best shown in FIG. 3, but as shown by the dotted lines 117 and 118 therein, a pair of panels 117 and 118 (FIG. 6) are formed at the outer lower corners of the chamber 108 to form it into a six sided cross section conforming at its outlet 109 exactly with the six sided shape of the inlet 110. The transition chamber 108 has an approximate height throughout of 10 inches, a beginning width of 69 inches and an approximate outlet of 34 inches.

The upper rear edge 119 of the top 108 of the housing 107 is hingedly connected at 121 to the front upper edge 122 of the inlet 111, and the lower portion 123 of the rear of the housing 107 overlaps the lower portion 124 (FIG. 7) of the inlet 110. Exposure of the chamber 108 and the inlet 110 opening is further prevented by a closure panel 126 pivoted to the front 127 of the crop blowing unit 43 and held upwardly against the housing 107 at all times by a piston 128 continually biased against the panel 126 by conventional means 129 pivoted at the base of the unit 43 to the frame unit 36.

The crop blowing unit 43 (FIGS. 1 and 2) includes a lower circular housing 131 (FIGS. 5 and 6) having an approximate diameter of forty eight inches and having a drive shaft 132 in the center thereof directly below and symmetrically formed across the front 127 of the housing 131 is the inlet 110 (FIG. 5). Mounted on the shaft 132 is a large disc 133 to which a plurality, six in this instance, of angle irons 134 are secured in radially extended, arcuately spaced arrangement, and at the outer end of which paddles 136 are secured, and form with the irons 133 fan blades for lifting the crop upwardly. The drive shaft 132 forms the axis of the fan blades 133, 136.

The upwardly converging discharge tube or housing 44 is mounted on top of the circular housing 131, forming therewith a completely open chamber (see FIG. 6) leading via an oscillating joint 137 to the curved discharge tube end 46 (FIG. 11).

As mentioned hereinbefore, the drive train 48 (FIG. 2) for the vehicle 13 connects to and receives drive from the tractor p.t.o. 49 (FIG. 1) and includes a U-joint at 141 (FIGS. 3 and 5), shaft 142, U-joint 143, transfer box 144 from which drive is taken laterally by shaft 146 (FIG. 8) to pulley 147 and by belt 148 to pulley 149 for flail driven shaft 63. Shaft 151 leads rearwardly from the box 144 to joint 152 at drive shaft 132. From the rear of the shaft 132 (FIG. 3) it will be noted that power is taken by a pulley 153 and belt 154 to an oscillator drive unit 156 and the gear reduction unit 32, but that does not go to the present invention.

It will be noted the drive train is disposed generally horizontally between the tractor p.t.o. 49 and the axis of the blower unit 43, and that it also is disposed along the longitudinal axis of the vehicle 13.

In operation of the vehicle 13, assume the crop gathering apparatus 19 is in the raised, transport position of FIG. 4. The vehicle 13 is transported lengthwise over a row of pre-cut hay or a pair of rows of stover. Prior thereto, fluid is released from the cylinder 89 such that gravity effects a lowering of the pickup housing 92 and the transition housing 107 to their FIG. 5 positions until the roller 103 engages the ground 72. It should be noted that the height of the roller 103 relative to the housing 92 is vertically adjustable.

During the lowering, the pickup housing 92 rotated about points 81 and 109 at upper front and rear, with the cylinder piston 157 (FIG. 5) extending, link 87 moving clockwise within U-member 84 — the front 86 thereof forcing the link, the shaft 78 and arms 79 also rotating clockwise. Simultaneously, the transition housing 107 is pivoting about its hinge points 109 and 119 to lower relatively in place with the pickup housing 92.

In use, operation of the drive train 48 causes rotation of the flail unit 41 clockwise as viewed in FIG. 5 and the blower unit 43 clockwise as viewed in FIG. 6, whereby the crop is picked up within the chamber 96, flung through the transition chamber 108 axially of the vehicle 13, substantially horizontally, and co-axially of the direction of movement of the vehicle. Within the chamber 108, the crop is converged laterally only and transmitted into the lower center of the blower unit housing 131 where the direction of movement is changed 90° to an upward movement for discharge into the wagon 21, still axially of the vehicle, except for the oscillation movement.

Should the roller 103 (FIG. 5) be moved upwardly due to an incline in the terrain, the capability of the gathering housing 92 and transition housing 107 to float is clearly seen. The arms 73 and 74 move the housing 92 slightly rearwardly of the frame member 55 depending upon the location of the slots 82 relative to the projections 81, lost motion could occur such that the rock arms 79 would not be affected, the housings 92 and 107 floating on their hinged connections. Conversely, the rock arms 79 could be forced slightly counterclockwise as viewed in FIG. 5, however due to the capability of the member 84 moving counterclockwise or forwardly and away from the link 87 without forcing the piston 157, this lost motion connection also permits considerable vertical free movement of the housings 92 and 107.

To lift the housings 92 and 107, application of fluid to the cylinder 89 to rotate the link 87 counterclockwise as viewed in FIG. 5 readily results in a general counterclockwise and upward movement of these elements to their FIG. 4 position for travel and transport.

We claim:

1. A crop gathering machine comprising:
   frame means;
   crop gathering means pivotally mounted on said frame means and adjustable between vertically spaced positions, said gathering means having a rotatable unit extended transversely to the normal direction of travel of the machine and operable to pick up and throw the crop rearwardly thereof relative to the said normal direction, said rotatable unit including a plurality of flails rotatably connected to a shaft of said unit, a housing extending around said rotatable unit and having an opening at the bottom and at the rear thereof;
   crop receiving means including a receiving means housing connected in direct communication to the rear opening of said gathering means housing for transferring the gathered crop rearwardly and co-axially of the said normal direction of travel, said crop receiving means consisting of an enclosed chamber substantially free of obstructions to the passage of gathered crops, said enclosed chamber extending substantially horizontally and rearwardly of said gathering means and in line with the center of said gathering means, said enclosed chamber converging in transverse width as it extends rearwardly;

crop blowing means connected in direct communication with said receiving means to the rear thereof, said blowing means including a vertically disposed chamber having an inlet and an outlet and having a fan rotatably mounted therein for rotation about a horizontal axis co-axial of the said normal direction of travel, said chamber of said crop receiving means being in direct communication with the inlet of the crop blowing means chamber.

2. A crop gathering machine as described in claim 1, and wherein said gathering means includes a generally cylindrical housing for said rotatable unit, and further wherein means is provided on said frame for adjustably raising and lowering said housing and unit together relative to the ground.

3. A crop gathering machine as described in claim 2, and further wherein said housing includes a ground engageable roller vertically adjustably connected thereto.

4. A crop gathering machine as described in claim 3, and further wherein said housing has an elongated opening formed therein across the upper rear end thereof through which the gathered crop is discharged by operation of said rotatable unit.

5. A crop gathering machine as defined in claim 1 wherein the inlet of the crop blowing means chamber has a vertical height of less than half the diameter of the fan of the crop blowing means.

6. A crop gathering machine as defined in claim 1 wherein the width of the inlet of the crop blowing means chamber is less than the diameter of the fan of the crop blowing means.

7. A crop gathering machine as defined in claim 1 wherein the chamber of said crop receiving means is an auger-free chamber.

8. A crop gathering machine as described in claim 1, and wherein said chamber is formed by a housing which is pivotally connected at its upper front to said crop gathering means.

9. A crop gathering machine as described in claim 1, and wherein said chamber is disposed generally horizontally within a housing, and further wherein said gathering means includes a cylindrical housing to the upper rear of which the front upper portion of said receiving means housing is pivotally connected.

10. A crop gathering machine as described in claim 1, and wherein said blowing means chamber is enclosed in a housing which extends upwardly, having an outlet at the upper end thereof vertically above the remainder of the machine.

11. A crop gathering machine as described in claim 10, and wherein said housing has an opening formed in the front thereof centrally and just below the axis of said fan, and further wherein said receiving means also includes a rearwardly extended housing open at the rear end thereof, which rear end registers with said opening.

12. A crop gathering machine as described in claim 11, and wherein said receiving means housing is pivotally connected at its upper rear end to said blowing means housing.

13. A crop gathering machine as described in claim 2, and wherein said adjustable means comprises a shaft rotatably mounted to the upper front of the gathering means housing, a pair of rocker arms each secured at one end to said shaft and connected at the other end to said housing within a slot formed therein, a piston and cylinder device connected between said frame and said shaft, and lost motion means linking said piston and cylinder device to said crop gathering machine housing for allowing the piston and cylinder device to pull the crop gathering means housing upwardly but allowing the crop gathering machine housing to move upwardly beyond the point moved by the piston and cylinder device when the crop gathering means passes over an elevated surface in the terrain over which the machine is traversing.

14. A crop gathering machine as described in claim 13, and wherein a pair of parallel links are pivotally connected at one end thereof to said frame means at a point spaced from said shaft and at the other end thereof the lower portion of said housing, said links working in conjunction with said rock arms to move said gathering means vertically while maintaining its horizontal disposition over the ground.

* * * * *